Feb. 5, 1924.
C. HENRICHSEN, JR., ET AL
1,482,895
GAS REGULATOR
Filed Feb. 4, 1921
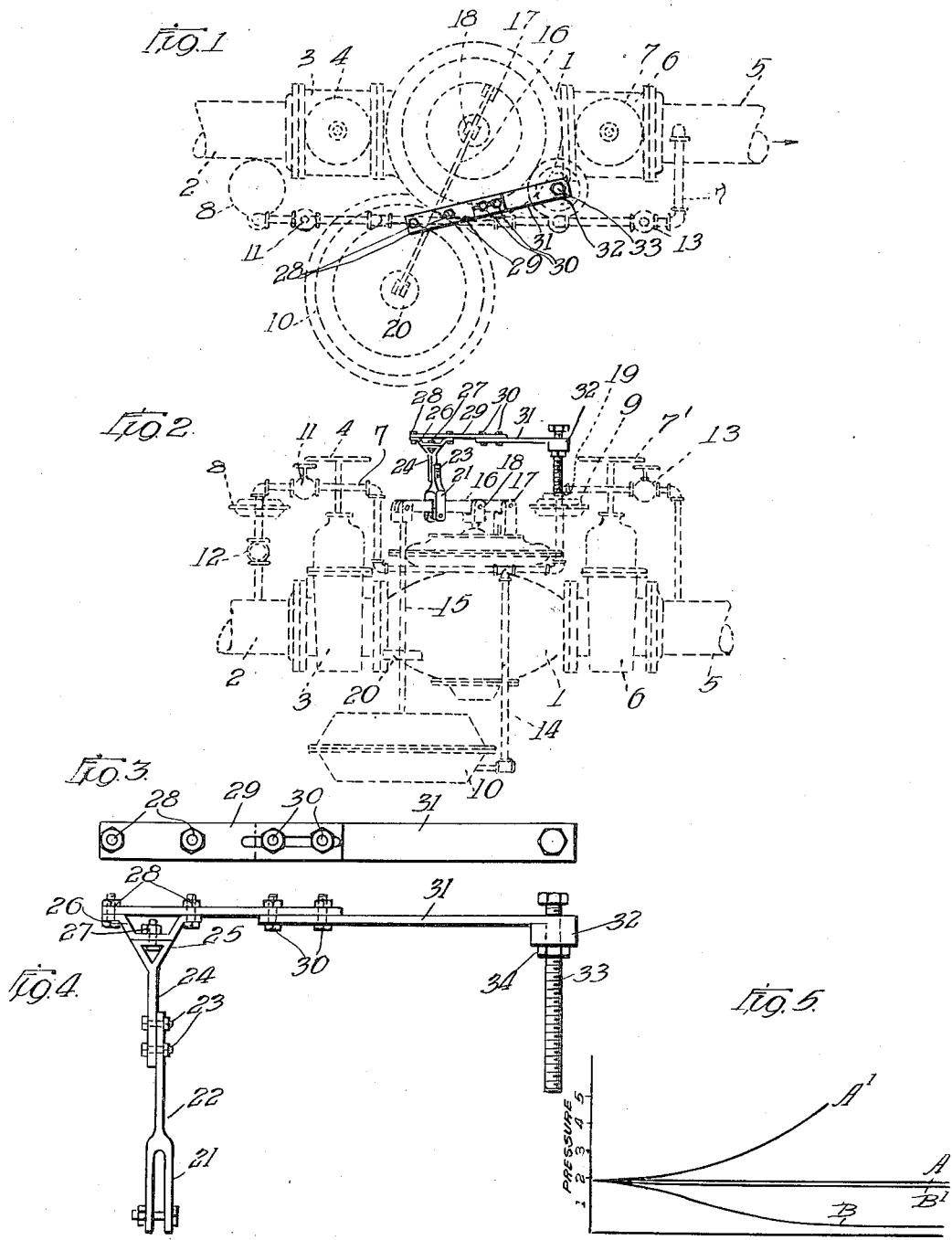

Patented Feb. 5, 1924.

1,482,895

UNITED STATES PATENT OFFICE.

CHRIST HENRICHSEN, JR., OF WILMETTE, AND EDMUND A. LUNEY, OF EVANSTON, ILLINOIS.

GAS REGULATOR.

Application filed February 4, 1921. Serial No. 442,439.

*To all whom it may concern:*

Be it known that we, CHRIST HENRICHSEN, Jr., and EDMUND A. LUNEY, both citizens of the United States, residing at Wilmette, in the county of Cook and State of Illinois, and Evanston, in the county of Cook and State of Illinois, respectively, have invented a certain new and useful Improvement in Gas Regulators, of which the following is a full, clear, concise, and exact description, reference being had to the accompanying drawings, forming a part of this specification.

This invention relates to systems for distributing fluids, such as gas, illuminating or otherwise, where moderate or high pressure mains are employed for delivering gas to outlying districts or to distributing district mains.

The invention finds its particular utility in connection with gas regulators which are placed at the junction of the high pressure main and its tributaries, which supply the consumer, for regulating the pressure on the consumer's end. In the present practice the pressure drop between the primary or high pressure main and the secondary or low pressure and the flow between these mains are controlled by an automatically operating reducer valve. Under ordinary demands and within certain limits the regulator quite efficiently controls the distribution of gas. However, when the demand for gas increases, and the rate of flow through the mains increases beyond a certain rate, there is a tendency for the pressure to drop at the consumer's outlets, which cannot be taken care of by the regulator. This has necessitated in many instances dispatching a man to the place to make a change in the setting of the regulator to take care of peak loads, as will be pointed out later. Obviously, this is a cumbersome and unsatisfactory, as well as expensive manner of handling the situation. The reason for this failure of the gas regulator to give the proper pressure at the outlets is due to the entrance of another factor, namely, friction of the gas with the distributing pipes. We have observed that when there is a relatively small flow through the distributing pipes the drop in pressure at the consumer's outlet is substantially zero, so that for all low rates of flow the restriction of the regulating valve forms substantially the sole obstruction, and hence the control of the regulating valve may properly be performed by a member or diaphragm subject to variations of pressure. In other words, for low rates of flow through the distributing pipes the pressure at the outlets may be maintained substantially equal to or proportional to the pressure immediately beyond the regulating valve. However, as soon as the flow increases in the distributing pipes to a point where the friction against the pipe walls causes a drop of pressure at the consumer's outlets the regulation must be varied. We therefore add a further control which automatically controls the position of the regulating valve to give a higher pressure at the discharge end of said valve so that the drop in pressure may be compensated for.

For a substantially equal difference in pressures between the high pressure side and the low pressure side of the valve, the position of the valve itself may serve as a meter of the amount flowing through the said valve. When the valve assumes a certain position we know that a certain corresponding amount of gas is flowing. This position corresponds to a flow which will cause an appreciable friction and consequent loss of pressure at the consumer's outlets. Since the drop in pressure due to flow is a function of flow, and since the position of the regulating valve is a measure of flow, we provide a connection between the regulating valve and the pressure sensitive control element, so that the adjustment or loading of the pressure sensitive element is varied in a certain relation to the rate of flow. Thus, the control of the regulating valve from a constant pressure control to a flow control is secured for the purpose of keeping the pressure at the consumer's outlets substantially constant.

The device which we provide is adjustable, so that the law of variation of loading the pressure sensitive element may be varied to conform to the particular distributing system which is to be served.

The primary aim of this invention is to improve upon the regulator whereby the device may be caused to regulate the flow, so that beyond a certain point the pressure in the secondary or distributing mains is increased with the flow, whereby the pressure at the consumer's outlets is maintained substantially constant. Furthermore, the device of this invention is capable of installation on the present prevailing type of regulator without structural alteration of the regulator itself.

While there is disclosed and described later in detail a particular structure having a specific application, it will be obvious that the essence of the invention resides in its improvement of the method of distributing gas as now practiced, and the invention in its future adaptations is therefore only limited by the scope of the appended claims.

A more concrete understanding of this invention may be obtained from the following detailed description taken in connection with the accompanying drawings, in which:

Figure 1 is a plan view of a regulator showing the present invention applied;

Figure 2 is a side elevation of the same;

Figure 3 is a plan of the invention detached;

Figure 4 is a side elevation of the same; and

Figure 5 is a diagrammatic view illustrating the function of the present invention in curves.

Referring more particularly to the drawings, in Figures 1 and 2 the regulator is shown in dotted lines and the present invention is shown in full lines, the regulator being of a standard type known as the Reynolds gas regulator.

To facilitate the disclosure and description, we will briefly refer to and describe the Reynolds regulator and its general function. This regulator consists of a housing or valve casing 1 which contains the main regulator valve of the device, the high pressure main 2 being connected to the housing 1 through a gate valve 3. The valve 3 is controlled by a wheel 4. The low pressure or distributing main is shown at 5 and connects with the housing 1 through a gate valve 6 controlled by a wheel 7'.

A by-pass is provided comprising a regulator 8 connected to the high pressure line under control of a shut-off 12, a needle valve 11 controlling delivery to pipe 7 connected intermediate its length through tap 14 to the auxiliary pressure bowl 10 and leading to regulator 9, connected under control of shut-off valve 13 to the low pressure main 5. Bowl 10 has a diaphragm for actuating vertical rod 15 connected to lever 16 fulcrumed at 17 and having the stem 18 of the main valve connected thereto. A weight 20 biases lever 16 in a direction to open the valve.

Regulator 8 operates to deliver a substantially constant pressure on its delivery side regardless of the pressure in the high pressure line. This pressure is materially higher than that in the low pressure line, and is preferably adjusted at a value that will secure perfectly tight closure of the main valve, without overloading it so as to injure it. Regulator 9 is loaded by a weight 19 and operated by the pressure in the low pressure main, and functions to connect pipe 7 to the low pressure main whenever the low pressure goes below a certain point. The needle valve 11 is set to permit flow at a materially lower rate than regulator 9 when open, so that regulator 9 can vary the pressure in the auxiliary bowl 10 between that delivered by regulator 8 and that in the low pressure line. In this way a very sensitive control of the main valve is secured by regulator 9, which functions to automatically maintain a substantially constant pressure in the low pressure line of the control valve. However, the desideratum, as above pointed out, is not constant pressure at the control valve end of the low pressure line, but at the consumer's outlet, and under heavy load the friction loss of head in the low pressure pipes cuts down the pressure at the consumer's outlet and the regulation is no longer satisfactory. It has been customary to send a man to the point at which the regulator is located to change the weight 9 and thereby change the regulation of the device.

We accomplish this automatically by means of a connection between the arm 16 and the weight 19 on regulator 9. The device for accomplishing this preferably consists of a clamp 21 adapted to engage rigidly the arm 16. The clamp 21 is provided with an arm 22 which extends vertically, and said arm 22 is adjustably connected by means of bolts 23 to a link 24, said link having a head 25 thereon pivotally connected to a saddle 26, this connection being formed by a bolt 27. The saddle 26 is bolted or otherwise secured at 28 to a strap 29, this strap being adjustably connected by means of bolts 30 to an extension 31 of the strap, the extension 31 having a head 32 thereon through which a tappet screw 33 is engaged. The screw 33 being adjustably locked by a nut 34, is adapted to normally remain out of contact with the weight 19. The law of variation of the loading caused by the connection between the gas regulator valve lever 16 and the weight 19, should conform to the law of variation of drop in pressure in the distributing mains due to flow.

Since the law of variation of drop of pressure is different for each distributing system, it is necessary that the loading be regulable to conform to the requirements of the system. To secure this we provide adjustments whereby the degree of motion of the contacting stud 33 may be varied by adjusting the clamp 21 along the lever 16. The point in the movement of the regulating valve (which corresponds to a certain rate of flow) is adjustable by adjusting the height of said stud above the weight 19. The various adjustments of the device permit facile application of the same to the regulator, as well as permitting quick and convenient calibration of the device. In operation, when the regulator fails to handle the demand for gas the tappet screw 33 comes into contact with the weight 19 and changes the calibration of the regulator 9; in other words, changes the pressure effective upon the auxiliary bowl 10. This pressure is, of course, applied in the right direction to cause the diaphragm to further collapse, permitting a further opening of the main valve, thus increasing the pressure in the low pressure main.

It will be observed that under normal operating conditions the device of our invention is inactive in so far as it affects the operation of the regulator. However, as soon as the rate of flow tends to cause a drop in pressure at the consumer's end, the device operates to extend the function of the regulator. As a diagrammatic illustration of the relative pressures, reference may be had to Figure 5. The factors for consideration are represented in terms of pressure and rate of flow. We will first refer to curves A and B. The line A indicates the constant pressure on the distributing side of the regulator. The line B indicates the pressure at the consumer's end from no load to maximum peak load, this line dropping off as soon as the demand reaches a certain predetermined rate of flow. The reason for this inflection in the curve is that so long as the flow is relatively small, the friction against the walls of the pipe is relatively negligible. Up to this point the restriction to flow is all contained in the valve of the regulator. After the friction with the walls due to flow becomes noticeable, the valve obviously cannot give adequate regulation. Assuming that the rates of flow are indicated by the numerals 1 to 10, inclusive, and that a normal rate of flow is 2, the pressure at the consumer's end as indicated by the line B would not appreciably decrease, but it will be seen that as soon as the rate of flow increases to a point where friction due to flow becomes noticeable, the pressure begins to drop at the consumer's end, although the pressure line A may remain constant. In order to keep the pressure at the outlets as nearly constant as possible, we increase the distribution pressure as the rate of flow increases according to the curve A', so that with our invention, as long as normal conditions prevail, the decrease in pressure at the consumer's end will be of such a small degree as to not be noticeable, or in fact zero or some positive rise. Pursuant to our improvement, as soon as the limit of the regulator is reached, say at the point 2, the tappet screw 33 engages the weight on top of the regulator 9 to raise the distributing pressure in accordance with the curve A'. Such a rise in the distributing pressure will cause the pressure at the outlets to be maintained, as shown by the line B'. As a matter of fact the line B' may be coincident with the line A, or it may fall either below or above, as may be desired.

Thus, it will be seen that what we do is to restrict the flow between the mains to maintain a relatively constant pressure upon the distributing main until a predetermined flow is reached. Thereafter, we restrict the flow between the mains inversely in some proportion to the flow to secure a pressure in the distributing main which increases with the flow, or in accordance with the curve A'. Thus, the pressure at the consumer's outlets may be caused to remain practically constant throughout the capacity of the system. Of course, it is understood that the demand on the distributing main is so arranged when the system is installed, that it is not expected to reach a point which requires a full opening of the main valve of the regulator. This is advisable in any system, that is, that the source of supply shall be of greater capacity than the demand will require at peak load.

It will be quite obvious that the invention is not restricted to the particular apparatus disclosed and described. This method of controlling the flow of any liquid in the manner described could be as easily applied to regulators of different styles.

We claim:

1. The method of distributing a fluid such as gas from a source of relatively high pressure to a low pressure distributing main having controllable outlets, which comprises restricting the flow of fluid to maintain a relatively constant pressure upon the distributing main until a predetermined flow is reached, thereafter restricting the flow between the mains to secure a pressure in the distributing main which increases with the flow.

2. In combination, a valve controlling flow of a fluid such as gas from a high to low pressure conduit, regulating means for said valve responsive to variations in the difference of pressure in said conduits, a stem for said valve, and a lever connected thereto, a clamp rigidly engaging said lever, an arm adjustable on said clamp, adjustable means on the end of said arm for engagement with a movable part of said regulating means when the valve assumes a predetermined position, and said clamp being adjustable longitudinally on said lever.

3. In combination, a valve controlling flow of a fluid such as gas from a high to low pressure conduit regulating means for said valve responsive to variations in the difference of pressure in said conduits, a stem for said valve, and a lever connected thereto, a clamp rigidly engaging said lever, an arm adjustable on said clamp, said arm comprising relatively adjustable sections, a screw on the free end of said arm for engagement with a movable part of said regulating means when the valve assumes a predetermined position, and said clamp being adjustable along said lever for changing the leverage of the said adjustable arm.

4. In combination with a Reynolds type pressure controlling valve having a main valve and a regulator controlling the operation thereof, a mechanical connection between said main valve and regulator for changing the adjustment of the regulator at certain positions of the main valve.

5. In combination with a Reynolds type pressure controlling valve having a main valve and a regulator controlling the operation thereof, a connection between said main valve and regulator for changing the adjustment of the regulator to increase the pressure on the low pressure side of the valve at large valve openings.

6. In combination with a Reynolds type pressure controlling valve having a main valve and a regulator controlling the operation thereof, a lost motion mechanical connection between said main valve and regulator for changing the adjustment of the regulator to increase the pressure on the low pressure side of the valve at large valve openings.

7. In combination with a Reynolds type pressure controlling valve having a main valve and a regulator controlling the operation thereof, a mechanical connection between said main valve and regulator for changing the adjustment of the regulator at certain positions of the main valve, said connection being composed of additional parts, and means for clamping them in place on a valve already in service without taking it out of operation.

8. The method of delivering gas at a variable pressure from a Reynolds type valve having a main valve and a regulator controlling the same, which comprises varying the load of the regulator as a function of the opening of the main valve.

9. In combination with a control valve having a main valve beam and a loaded regulator for the main valve, mechanism clamped on said beam for contacting said regulator to change its adjustment at certain valve openings.

10. In combination with a control valve having a main valve beam and a loaded regulator for the main valve, mechanism clamped on said beam for contacting said regulator to change its adjustment at certain valve openings, and means for adjusting said mechanism to vary the movement ratio between the parts it connects.

11. In combination with a control valve having a main valve beam and a regulator for the main valve, mechanism clamped on said beam for contacting said regulator to change its adjustment at certain valve openings, and means for adjusting said mechanism to vary the valve position at which it begins to affect said regulator.

12. In combination with a control valve having a main valve beam and a loaded regulator for the main valve, mechanism clamped on said beam for contacting said regulator to change its adjustment at certain valve openings, means for adjusting said mechanism to vary the valve position at which it begins to affect said regulator, and additional adjustment means for varying the movement ratio between the parts connected by said mechanism.

In witness whereof, we hereunto subscribe our names, this 31st day of Jan., 1921.

CHRIST HENRICHSEN, Jr.
EDMUND A. LUNEY.